United States Patent Office 3,316,643
Patented May 2, 1967

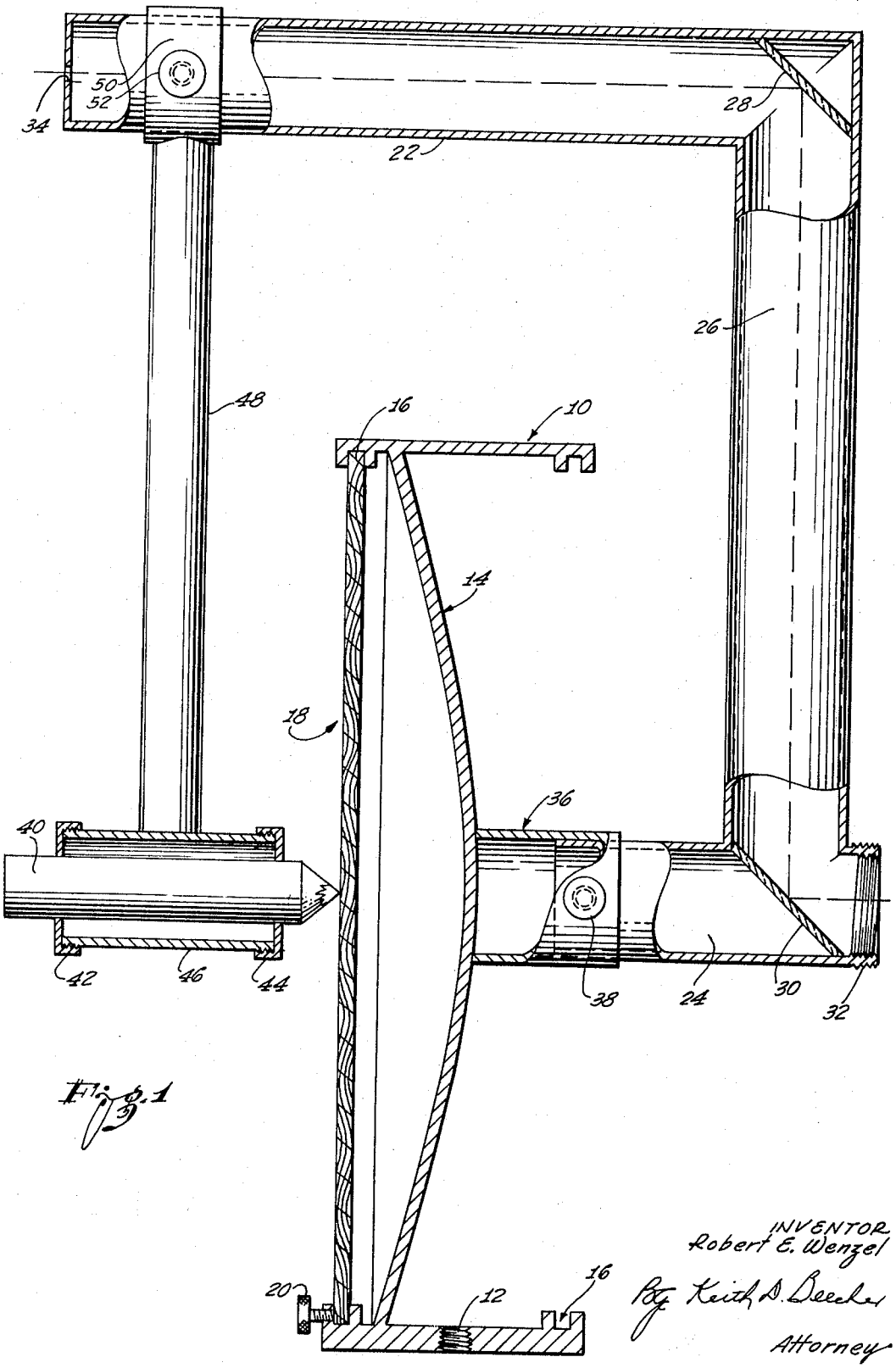

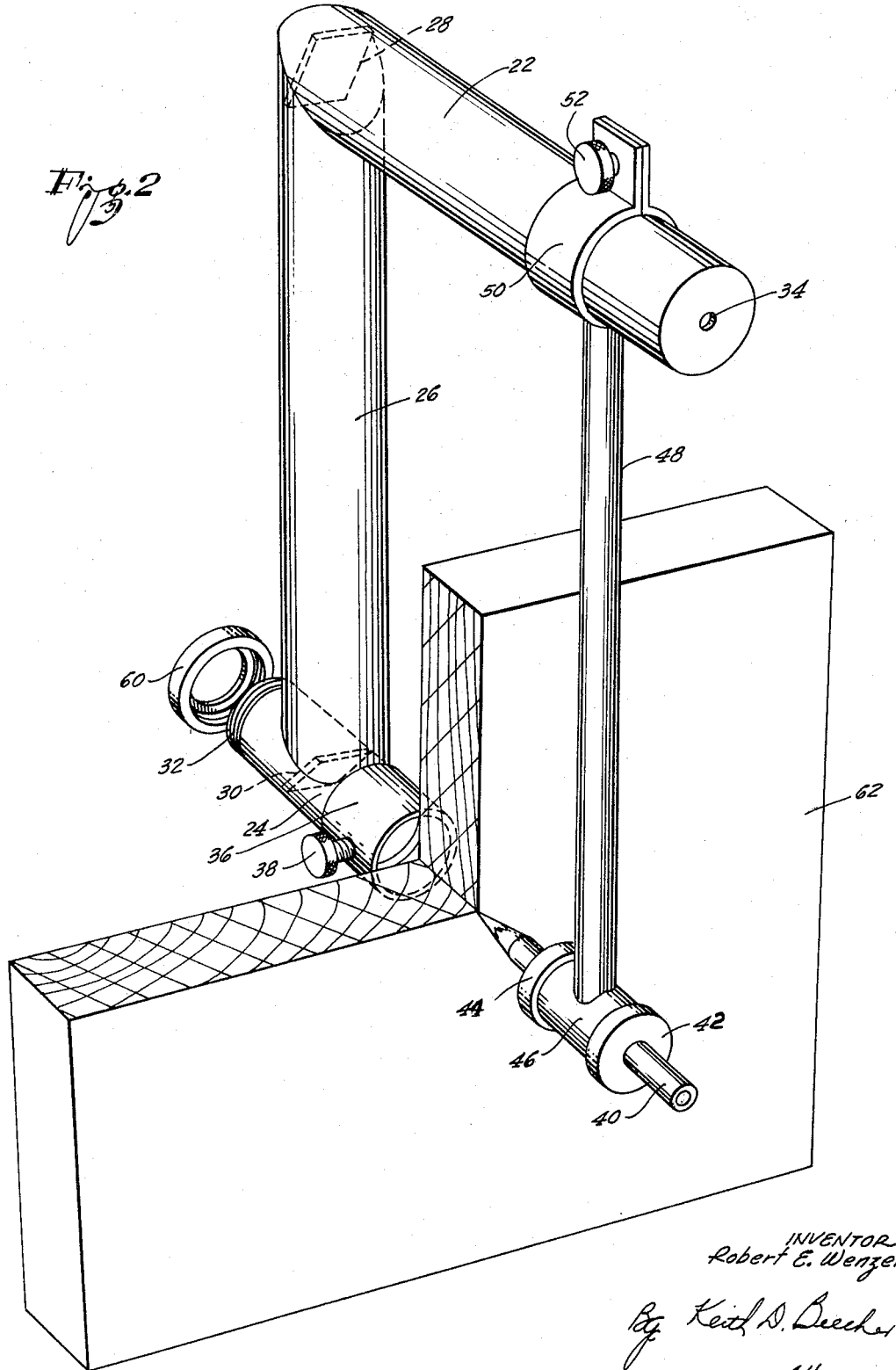

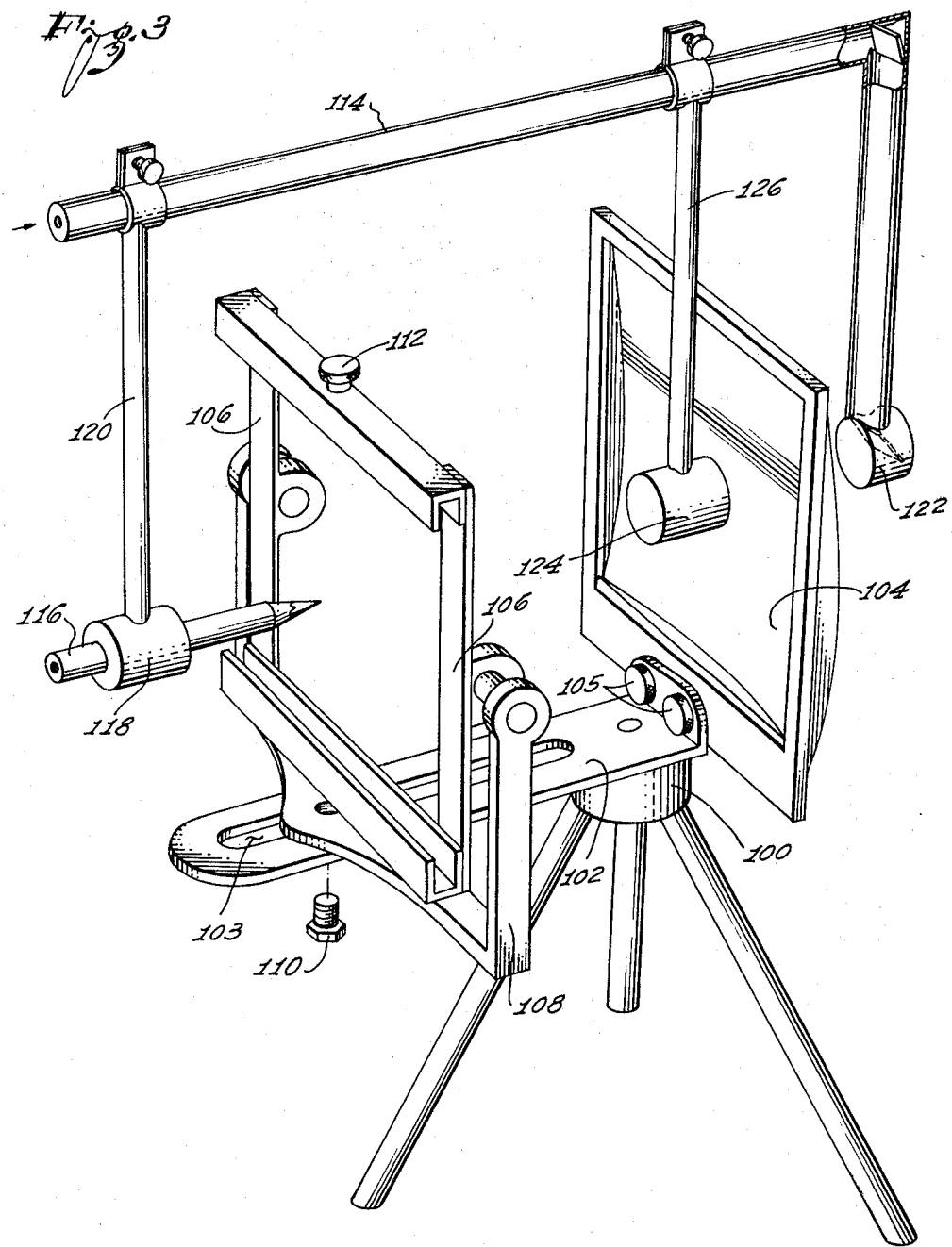

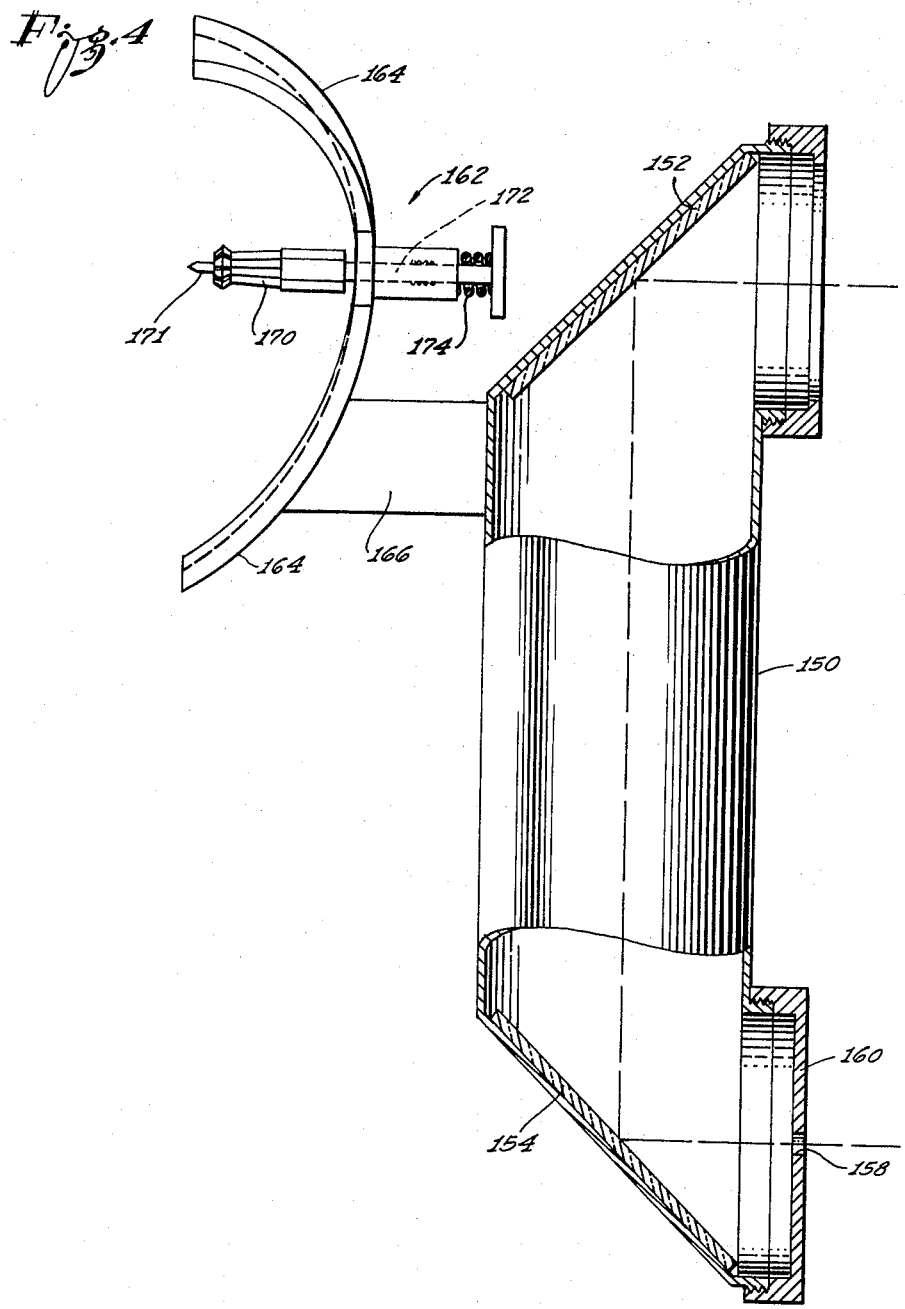

3,316,643
DRAWING INSTRUMENT
Robert E. Wenzel, Los Angeles, Calif.
(1517 E. 7th St., Ontario, Calif. 91762)
Filed Dec. 28, 1964, Ser. No. 421,470
19 Claims. (Cl. 33—20)

The present invention relates to drawing instruments, and the like, and it relates more particularly to an improved instrument which permits reproductions of a viewed subject, or scene, to be made quickly and accurately.

Drawing instruments of many types are known to the art. The usual type of instrument includes a pantograph linkage having a movable pointer, and it also includes a fixed optical sighting member. The pointer is viewed through the sighting member, as it is moved across the subject to be reproduced, and a suitable inscribing element is mounted on the pantograph to reproduce the subject on a drawing board as the pointer is so moved.

It has been found virtually impossible, however, in the prior art instruments of the type described in the preceding paragraph, visually to follow the movable pointer through the fixed sighting member with any degree of accuracy. This militates against any possibility for a precise reproduction to be made with instruments of that type. For example, any attempt to obtain an accurate reproduction with such a type of prior art instrument may be likened to an attempt to hit a moving object with a rifle, when the front sight of the rifle is in motion with respect to the rear sight.

Another type of prior art drawing instrument has been constructed in an attempt to overcome the deficiences of the instrument mentioned above. The latter type of instrument provides that the pointer and optical sighting member be mounted in fixed relationship with one another, so as to increase the accuracy with which reproductions may be made. However, the latter type of prior art instrument is generally of an awkward size, and it usually involves heavy gimbals, or the like. For that reason, difficulties have been encountered in operating and transporting the instrument, and also in providing a suitable portable mount for supporting the instrument.

The present invention provides an improved drawing instrument which operates on a periscope principle, so as to provide a simple mechanism, and one which is easy to manipulate and which successfully overcomes the disadvantages inherent in the prior art arrangements, such as those mentioned above.

As will be described, the improved instrument of the present invention combines a periscope-like component and a drawing board, with an element which defines a bearing surface. The bearing surface, as will be explained, may be flat, concave or convex. Moreover, the bearing surface may have any desired complex shape so as to introduce controlled predetermined distortion effects into the reproduction.

The assembly of the invention essentially provides an optical pantograph, whereby enlargements, reductions, or same-sized reproductions may be made, all without any need for mechanical pantograph linkage arms, or the like. Moreover, such reproductions may be made with the instrument of the present invention at close range or at a considerable distance.

The periscope component of the instrument of the invention is moved manually over the aforesaid bearing surface in the operation of the instrument of the invention. Prior to such operation, the artist can select the element providing the particular bearing surface radius he desires for the particular reproduction. For example, the use of a convex surface will result in a reduction in size of the reproduction as compared with the original subject. Conversely, the use of a concave bearing surface will produce enlargements, and other interesting and unique results. If a flat bearing surface is used, the reproduction will be a true orthographic view of the subject, drawn to exact size, without vanishing points or diminishing lines, regardless of the distance between the subject and the drawing board.

The ability of the instrument of the invention to produce enlargements, when using a concave shape for the bearing surface with a long focal length, results in startling distortions in the reproduction.

For example, if an object is placed in the line of view of the instrument between the concave bearing surface and the focal point, the object will be drawn with its perspective lines diverging towards the focal point, rather than converging. This, of course, is directly opposite to the normal diminishing effect so well known to artists and photographers.

At the focal point, and beyond it, the background will be drawn upside down and reversed from right to left, when the aforesaid concave bearing surface is used.

Thus, the instrument of the invention has the unique ability to produce startlingly distorted enlargements, plus reductions, plus reversals, plus two kinds of perspectives.

An object of the invention, therefore, is to provide an improved instrument which is capable of producing unique and interesting effects from true orthographic reproductions to startling distortions which are often weird and sometimes beautiful.

Another object of the invention is to provide such an improved instrument that not only finds utility as a scientific and instructive tool, but which also has wide appeal and may be sold to children as a toy so as to enable the child to reproduce common subjects and shapes into a variety of imaginative and delightful reproductions.

Yet another object of the invention is to provide such an improved instrument that finds utility, especially in an application of its distortion capabilities, in the decorative design of cloth, wall paper, and the like.

An important feature of the present invention, therefore, is the ability to draw true orthographic views of the subject without vanishing points or diminishing lines. Since such a view is the basis of all true engineering drawings, this function is highly desirable when the instrument is used for engineering purposes.

As noted, the aforesaid bearing surface may have a complex shape, and it may include different combinations of flat and curved surfaces. Such shapes of the bearing surface can be used to incorporate decorative controlled distortions into the reproduction. The size and curvature of the bearing surface for any desired angle of view, degree of reduction or enlargement, and the like, may be selected from a suitable chart; and a proper bearing element having the desired surface configuration can be selected from a set of such elements and placed in the mechanism for a desired reproduction.

The shape, weight and size of the easel assembly of the element defining the bearing surface are such that the instrument of the invention may be readily mounted on a usual photographic tripod, so that the entire assembly is portable to a high degree.

Another feature of the invention is that the frictional resistance between the aforesaid bearing surface and co-acting portion of the manually manipulated periscope-like component can be made extremely low. This means that the reproduction can proceed at a relatively high speed and without any noticeable "drag" in the instrument.

The drawing instrument of the invention, in addition to permitting reproductions to be made rapidly and easily, also has application to art instruction. The teaching aspects of the invention include demonstrations as to the underlying principles of reductions, enlargements, or exact size orthographic reproductions. The instrument of the invention also enables the art student to produce exactly dimensioned drawings quickly, and without the exercise of any particular artistic skill.

A further feature of the invention is that it permits a person to use any media, wet or dry; and it also permits the reproduction to be made on any surface. Moreover, the use of telephoto lenses in the mechanism of the invention enables reproductions to be made of objects from great distances, or permits wide angle views if desired.

An object of the present invention, therefore, is to provide an improved instrument for assisting the artist in making a reproduction, and which is not subject to the drawbacks and disadvantages of the prior art instruments described above, but which can be used readily and easily to make desired reproductions quickly and with a high degree of accuracy.

Another object of the invention is to provide such an improved apparatus which is capable of making such reproductions on an enlarged or diminished scale, if desired, and without any need for the use of distracting mechanical pantograph arms or other mechanical linkage which have a tendency to smear the reproduction.

A further important object of the invention is to provide such improved apparatus which permits true orthographic views to be reproduced at any distance from the subject on a 1:1 scale, without vanishing points or diminishing lines.

Yet another object of the invention is to provide such an improved instrument which uses a minimum of parts, and which can be made inexpensively so as to be sold at a relatively low price. For example, the improved instrument of the present invention can be made as an inexpensive toy for the mass market, or it can be made as a more elaborate scientific instrument.

Other features, objects and advantages of the invention will become apparent from a consideration of the following specification, when the specification is taken in conjunction with the accompanying drawings, in which:

FIGURE 1 is a side sectional view of one embodiment of the invention;

FIGURE 2 is a perspective view, partially in section, of a second embodiment;

FIGURE 3 is a perspective view of a third embodiment of the invention; and

FIGURE 4 is a perspective view of a fourth embodiment of the invention.

The embodiment of the invention shown in FIGURE 1 includes a housing 10. The housing 10 is adapted to be supported, for example, on a typical photographic tripod mount, or other suitable stand, and it includes a threaded socket 12 for that purpose. The housing 10 may be formed of metal, plastic, or other suitable substance.

The housing 10 includes an integral element 14 which defines a bearing surface. The element 14, in the illustrated embodiment, is shaped to have a concave bearing surface and a convex bearing surface. Appropriate slots 16 are provided in the housing 10 for supporting a drawing board 18. The drawing board may be clamped in place by set screws, such as the set screw 20.

It will be appreciated that the drawing board may be placed in the left hand slots, as shown in FIGURE 1, so as to expose the convex bearing surface of the element 14 to the right of the drawing. Conversely, the drawing board 18 may be placed in the right hand slots 16, and the housing reversed, so as to expose the concave bearing surface of the element 14 to the right hand side of the figure.

The element 14 provides a bearing surface, as mentioned. When the bearing surface is convex, a subject or scene is reproduced by the instrument on a diminished scale. Conversely, when the bearing surface is concave, the subject or scene is reproduced by the instrument on an enlarged scale in either a straightforward or distorted manner, as mentioned above. If desired, the element 14 may be made flat, and be parallel to the drawing board 18. Then, the reproductions of the subject are drawn to exact size, regardless of the distance between the subject and the drawing board. This, as mentioned above, enables true orthographic reproductions to be made, without vanishing points or diminishing lines.

In order to permit the artist effectively to "see" through the drawing board 18, and through the reproduction on the drawing board, the instrument of the invention includes a periscope-like component. This component includes an upper portion 22 and a lower portion 24. It also includes an intermediate portion 26 which interconnects the upper and lower portions, and holds the upper and lower portions in spaced parallel relationship.

An upper mirror 28 is mounted at the corner between the upper portion 22 and intermediate portion 26 of the periscope. The front surface of the mirror 28 is silvered, and it may be overcoated for protection. A lower mirror 30 is mounted at the corner between the intermediate portion 26 and lower portion 24 of the periscope, and the surface of this latter mirror is also silvered, so that it may reflect images received from the end of the lower periscope portion 24 remote from the bearing surface 14, when the instrument is in use.

The remote end of the periscope portion 24 may be threaded, as indicated by the threads 32, to receive filters and the like. Telescopic or telephoto lenses may be included in the periscope assembly, if so desired.

An optical sighting aperture 34 is formed in the left hand end of the upper portion 22 of the periscope. The lower mirror 30 preferably has a brightly colored dot in its center, or may incorporate a cross-hair sight. It will be appreciated that the image of the subject to be reproduced is transmitted into the right hand end of the lower portion 24 of the periscope, and is reflected by the mirrors 30 and 28 to the optical sighting aperture 34. Therefore, by grasping the periscope and moving the inner end of the lower portion 24 across the bearing surface defined by the rear face of the element 14, an observer may cause the periscope to be scanned across the subject, by observing successive points of the subject through the aperture 34, as designated by the spot or cross-hair sight on the mirror 30.

An extension tube 36 is mounted over the lower portion 24 of the periscope, and is held in place, for example, by a set screw 38. The extension tube 36 is mounted at the end of the lower portion 24 remote from the entrance, and at the left hand end of the lower portion in FIGURE 1. The extremity of the extension tube 36 is intended to be moved over the bearing surface 14, when the periscope is manually manipulated to scan the subject to be reproduced.

A scribing element 40 which may, for example, be a pencil, marking tool, paint brush, or the like, is slidably supported in a pair of rings 42 and 44. These rings act as arbors, and they are threaded to the opposite ends of a tube 46. The tube 46, in turn, is affixed to the lower end of a rod 48. The rod 48 is suspended from the upper portion 22 of the periscope by means, for example, of a ring 50. The ring 50 is adjustably mounted on the upper portion of the periscope and may be fixed by means, for example, of a set screw 52.

The element defining the bearing surface 14 may be composed of a magnetic material so as to hold the end of the tube 36 on the surface by magnetic force. This facilitates the operation of the mechanism since there is then a natural tendency for the periscope to be supported on the bearing element. With such an assembly it is only necessary for the artist to move the periscope over the bearing surface and minimum effort need be expended to support the periscope.

It will be appreciated that the same effects can be achieved pneumatically. This may be realized by creating a vacuum pressure in the extension 36 so as to create a suction between that section and the bearing surface.

The scribing element 40 may be mounted in a chuck with other scribing elements. Then the chuck may then be turned from one position to another selectively to bring the different scribing elements into inscribing relationship with the drawing board.

In operating the instrument, an appropriate housing 10 is selected, so as to provide a desired convex or concave bearing surface, or a flat bearing surface if orthographic views are to be made. It will be appreciated, of course, that the bearing element 14 need not be integral with the housing 10, but may be selected from a set of bearing elements of different shapes and sizes, to be mounted in the housing 10 for any particular reproduction.

When the selected bearing element 14 has been mounted in the housing 10, and the housing is positioned in a desired relationship with the subject to be reproduced, the extension tube 36 is adjusted to bring the mirror 30 into a desired relationship with the bearing surface, and the ring 50 is adjusted along the upper portion 22 to bring the scribing element 40 into scribing relationship with the drawing board 18. Then, the artist moves the periscope manually in a manner such that the extremity of the extrusion tube 36 moves over the bearing surface 14, as the subject to be reproduced is scanned by sighting successive elements of the subject through the viewing aperture 34, as they are designated by the cross-hairs or colored dot at the center of the lower mirror 30.

As the subject is so scanned by the periscope, the resulting movement of the extremity of the extension 36 across the bearing surface 14, causes the scribing element 40 to reproduce the subject matter on a reduced scale (in the illustrated embodiment) on the drawing board 18. The friction between the extremity of the extension tube 36 and bearing surface 14 can be reduced virtually to zero, so that the instrument can be moved freely across the bearing surface, and with no noticeable drag. This permits the reproduction to be made quickly and easily.

It will be appreciated that by suitable choice of the shape of the bearing surface 14, the assembly permits the reproductions to be made on an enlarged or diminished scale, or on a 1:1 ratio; and that this is achieved without the need for mechanical couplings, or linkages, such as the usual pantograph arms. The construction of the instrument is such that a precise relationship exists between the point of the scribing element and the corresponding point of the subject, as viewed through the periscope, so that a highly precise reproduction can be made, and there is no tendency to errors.

The embodiment of FIGURE 2 is generally similar to the embodiment of FIGURE 1, and similar elements have been represented by the same numerals.

In the embodiment of FIGURE 2, it will be noted that the periscope components 22, 24 and 26 are circular, whereas they have a rectangular cross-section in the embodiment of FIGURE 1, and that the mounting ring 50 has a somewhat different configuration from the embodiment of FIGURE 1. However, the periscope components in both embodiments are generally similar.

A retaining ring 60 may be threaded onto the threads 32, for supporting any appropriate lens, filter, or the like. As mentioned above, a tele-photo lens can be used, to permit reproductions to be made of objects at great distance, and to permit wide angle views. It will also be appreciated that the periscope could be aimed at a projection screen, so that the projected image from a slide projector could be reproduced.

When photographic filters are mounted in the ring 60, for example, the reproduction can be made under any desired filtering control. It will be appreciated, of course, that the mirrors 28 and 30 can be replaced by appropriate prisms, and that lenses in various combinations, such as are found in conventional periscopes and telescopes may be used in the periscope component.

In the embodiment of FIGURE 2, the housing 10 is replaced by a flat member 62. This member provides a flat bearing surface on its front face, and a drawing surface of its rear face. Due to the flat nature of the resulting bearing surface, the instrument of FIGURE 2 will reproduce true orthographic reproductions, as explained above.

The embodiment of the invention shown in FIGURE 3 permits lateral adjustment between the plane of the reproducing medium and of the bearing element. This permits size adjustments of the reproduction to be made. Also, the bracket holding the reproducing medium is tiltable so that controlled distortions can be introduced into the reproduction.

The latter embodiment includes a bracket 102 mounted on a tripod 100, or on any other appropriate support means. A bearing element 104 is removably attached to the bracket 102 by screws 105. This element defines, for example, a convex bearing surface on its front face and a concave bearing surface on its rear face.

A frame 106 is pivotally mounted in a bracket 108 which, in turn, is pivotally mounted (by means of a screw 110) in a slot 103 in the bracket 102. The drawing board, or other medium may be supported in the frame 106, by upper and lower channels, as shown. The drawing board may be held in place by means of a set screw 112.

It will be appreciated that the bearing element 104 may be selected from a set of such elements of different shapes and sizes, and mounted on the bracket 102 to be held in an upright position by the screws 105.

The drawing board may then be mounted in the frame 106 and the frame may be moved to a desired lateral position in the slot 103 with respect to the bearing element 104. This provides for a desired size in the reproduction. Then the drawing board may be tilted about either a horizontal or vertical axis, or both, to provide desired distortion effects in the reproduction.

The periscope component 114 may be similar to the periscope of the previous embodiments. As before, a scribing element 116 is slidably supported in an arbor 118 at the lower end of a rod 120. The rod 120 is suspended from the periscope and is adjustable along the top portion of the periscope as in the embodiments of FIGURES 1 and 2.

In the embodiment of FIGURE 3, the periscope includes a portion 122 which is adapted to coact with the front surface of the bearing element 104 and to be moved over that surface when the instrument is in use, as described above.

A further coacting member 124 may be suspended from the periscope 114 by a rod 126. This rod may be adjustably mounted along the upper portion of the telescope 114. The member 124 may be moved across the rear surface of the bearing member 104 as the instrument is used.

It will be appreciated, therefore, that the two surfaces of the bearing member 104 may have desired curvatures. Then, either the front surface may be used in conjunction with the member 122 for a first effect; or the rear surface may be used in conjunction with the member 124 for a second effect.

If desired, of course, the two surfaces of the bearing member 104 may be made complementary, and the members 124 and 126 adjusted so that both surfaces may be engaged by the members 124 and 122 respectively during operation of the instrument.

The embodiment of FIGURE 4 is particularly advantageous in that it is completely portable, and it dispenses with the need for an easel. In this embodiment the canvas, or other medium, itself forms the bearing surface. As before, the surface may be flat, convex, concave, or any desired shape.

The embodiment of FIGURE 4 includes a periscope 150 having an upper portion and a lower portion. An upper mirror 152, or equivalent reflecting element, is mounted in the upper portion; and a lower mirror 154, or equivalent reflecting element, is mounted in the lower portion.

The end of the upper portion is threaded as at 156, to receive filters, or the like, as in the previous embodiment. An optical sighting aperture, or peepsight, 158 is formed in a removable eyepiece 160. The eyepiece 160 is threaded on the end of the lower portion, and it is removable for cleaning purposes. Appropriate cross-hairs or a colored dot may be formed on the top mirror 152.

A scribing element 162 is mounted in a member 164, that member being attached to the periscope by means of an appropriate bracket 166. The member 164 may have a tripod, hemispherical, or any suitable shape, and it preferably is transparent.

The scribing element 162 includes a chuck 170, for example, which releasably holds a pencil lead 171, or other scribing instruments. The chuck 170 is affixed to one end of a spindle 172. The spindle 172 is spring biased to the right of the drawing, by means of a spring 174.

In using the instrument shown in FIGURE 4, the artist places the paper, canvas, or other medium on which the work is to be reproduced, on a flat or curved surface. For example, the surface may be the wall of a building. He then stands in front of the wall with his back to the subject he is drawing.

The artist holds the periscope 150 in both hands, one hand being used to direct the forward motion of the plunger formed by the spindle 172 and spring 174. In this way, the artist holds the pencil lead 171 firmly on the surface of the paper.

The periscope 150 may be shaped appropriately as a handle to permit the assembly to be grasped, as a pistol, if so desired. Also, a suitable lever may be provided to permit convenient actuation of the scribing element 162.

The artist views the subject through the peepsight 158, and he lines up the cross-hairs or dot on the mirror 152 with the different details of the subject, as the details are being drawn. The picture is then drawn, by moving the member 164 over the surface of the drawing paper, while holding the pencil lead 171 down on the paper, and while viewing the subject through the periscope 150.

As mentioned above, an advantage of the embodiment of FIGURE 4 is that it does not require a tripod, drawing board, or other type of work table. The drawing paper, as mentioned, may be mounted on a variety of surfaces, flat or curved. For example, automobile fenders, lamp bases, tree trunks, and other convenient surfaces may be used to support the drawing paper. These surfaces may be flat to provide true orthographic reproductions; or they may be curved to provide a variety of artistically distorted perspective effects.

The embodiment of FIGURE 4 is particularly useful in the rendering of engineering drawings. It is especially useful for providing an accurate drawing of difficult and inaccessible machine parts. For example, the unit can be placed on the floor and used to reproduce the underside of a machine, or other subject.

The member 164 which rubs against the drawing paper, or other medium, is preferably transparent, as mentioned above, so that it will not obstruct the view of the reproduction. As also noted, it may have any appropriate shape. It may be formed of soft rubber-like material, for example, or it may be solid.

As in the previous embodiments, the scribing element is aligned with the optical axis of the system, as shown, so as to avoid errors due to misalignment of the scribing element with the mirrors, or equivalent reflecting elements in the periscope 150.

It will be appreciated that there is no limit to the size of the reproducing medium used in conjunction with the instrument of FIGURE 4. For example, murals of any size may be drawn on any surface, flat or curved.

The reproducing surface with the embodiment of FIGURE 4, or with the other embodiments, may be a flat, or curved, horizontal surface. When the instrument shown in FIGURE 4 is held over such a surface, for example, the optical axis from the reflector 152 will be vertical. An external mirror may be mounted over the reproducing surface so as to reflect the last-named optical axis horizontally, if so desired.

The invention provides, therefore, an improved simple and inexpensive drawing instrument, which permits reproductions to be made in any desired perspective, and on an enlarged or diminished scale. Moreover, the improved and simplified instrument of the invention is extremely precise and accurate in its operation.

An important feature of the invention, as mentioned above, is its ability to reproduce true orthographic reproductions of any desired subject.

While particular embodiments of the invention have been described, modifications may be made. It is intended in the claims to cover such modifications.

What is claimed is:

1. A drawing instrument for making reproductions of a subject, said instrument including: first means defining a reproducing surface and a bearing surface; periscope means for sighting along a particular optical axis and including a first portion adapted to coact with said bearing surface and a second elongated portion extending over said first means when said first portion coacts with said bearing surface; a scribing element; and a support means for said scribing element affixed to said periscope means in position to support said scribing element in alignment with said optical axis and in inscribing relationship with said reproducing surface as said first portion of said periscope means is moved over said bearing surface.

2. The drawing instrument defined in claim 1 in which said support means for said scribing element is adjustably mounted on said elongated portion of said periscope means to be movable therealong.

3. The drawing instrument defined in claim 1 in which said periscope means includes a sighting aperture at the end of said second portion, indicating means optically aligned with said sighting aperture, and a receiving aperture at the end of said first portion remote from said bearing surface, so that a subject disposed to the rear of said reproducing surface is reflected by said periscope means to said sighting aperture.

4. The drawing instrument defined in claim 1 in which said bearing surface has a convex configuration.

5. The drawing instrument defined in claim 1 in which said bearing surface has a concave configuration.

6. The drawing instrument defined in claim 1 in which said hearing surface has a flat configuration.

7. A drawing instrument for effecting reproductions of a subject, said instrument including: a housing including means defining a reproducing surface on one side thereof and a bearing surface on the other side thereof; periscope means for sighting along a particular optical axis and including a first tubular portion, a second tubular portion, and a third tubular portion interconnecting said first and second tubular portions to hold the same in spaced and parallel relationship; a further tubular member adjustably mounted on one end of said first tubular portion and having an extremity adapted to coact with said bearing surface, said second tubular portion of said periscope means extending over the top of said housing and beyond the plane of said reproducing surface in front of said reproducing surface when said extremity of said further tubular member coacts with said bearing surface; a scribing element; and a supporting means for said scribing element adjustably mounted on said second portion of said periscope means in spaced and parallel relationship with said third tubular portion of said periscope means in position to support said scribing element in inscribing relationship with said reproducing surface and in alignment with said optical axis as said first portion of said periscope means is moved over said bearing surface.

8. The drawing instrument defined in claim 7 in which said periscope means includes a sighting aperture at the end of said second portion and, a pointer means optically aligned with said sighting aperture, and a receiving aperture at the end of said first portion remote from said bearing surface, so that a subject disposed to the rear of said reproducing surface is reflected by said periscope means to said sighting aperture.

9. A drawing instrument for making reproductions of a subject, said instrument including: a mounting member for a canvas and the like; a bearing member defining a bearing surface; means for supporting said mounting member and bearing member in adjacent relationship; periscope means for sighting along a particular optical axis and including a first portion adapted to coact with said bearing surface and a second elongated portion extending over the edges of said support member and said bearing member when said first portion coacts with said bearing surface; a scribing element; and a support means for said scribing element affixed to said elongated portion of said periscope means in position to support said scribing element in alignment with said optical axis and in inscribing relationship with said canvas as said first portion of said periscope means is moved over said bearing surface.

10. The drawing instrument defined in claim 9 in which said mounting member for said canvas is movable with respect to said bearing member.

11. The drawing instrument defined in claim 9 in which said mounting member for said canvas is tiltable with respect to said first-mentioned mounting member.

12. The drawing instrument defined in claim 9 in which said first portion of said periscope means is attractively held magnetically against said bearing surface.

13. The drawing instrument defined in claim 9 in which said first portion of said perisocpe means is held magnetically against said bearing surface.

14. A drawing instrument for making distorted reproductions of a subject, said instrument including: means defining a concave bearing surface having a relatively long focal length; periscope means for sighting along a particular optical axis and adapted to coact with said bearing surface; ascribing element; and means affixed to said periscope means for supporting said scribing element in alignment with said optical axis.

15. A drawing instrument for making reproductions of a subject, including: periscope means; a member configured to coact with a bearing surface; a bracket mounting said member on said periscope means; and scribing means mounted on said member.

16. The drawing instrument defined in claim 15 in which said scribing means is aligned with an optical axis of said periscope means.

17. A reproducing instrument for making reproductions of a subject, said instrument including: a first member defining a reproducing surface and a bearing surface; periscope means for sighting along a particular optical axis and including a first portion adapted to coact with said bearing surface and a second elongated portion extending over said first member when said first portion coacts with said bearing surface; a scribing element; and a supporting means for said scribing element affixed to said periscope means in position to support said scribing element in alignment with said optical axis and in inscribing relationship with said reproducing surface as said first portion of said periscope means is moved over said bearing surface.

18. The reproducing instrument defined in claim 17 in which said bearing surface is shaped to have a complex configuration so that controlled distortions may be incorporated into the aforesaid reproductions.

19. The reproducing instrument defined in claim 17 in which at least the portion of said first member defining said bearing surface is removable, so that different bearing surfaces of different sizes and curvatures may be selected for any desired angle of view, degree of reduction or enlargement, or distortion of the aforesaid reproduction.

References Cited by the Examiner
UNITED STATES PATENTS

| | | | |
|---|---|---|---|
| 154,068 | 8/1874 | Morse | 33—20 |
| 2,462,573 | 2/1949 | Turrenttini | 33—189 X |
| 2,711,022 | 6/1955 | Salfelder | 33—24 X |

FOREIGN PATENTS

| | | |
|---|---|---|
| 361,318 | 4/1906 | France. |
| 35,156 | 6/1922 | Norway. |

LEONARD FORMAN, *Primary Examiner.*

H. N. HAROIAN, *Assistant Examiner.*